Jan. 31, 1933.  A. A. SMALLWOOD  1,895,823
FREIGHT CAR HAND BRAKE
Filed Nov. 26, 1929  2 Sheets-Sheet 1
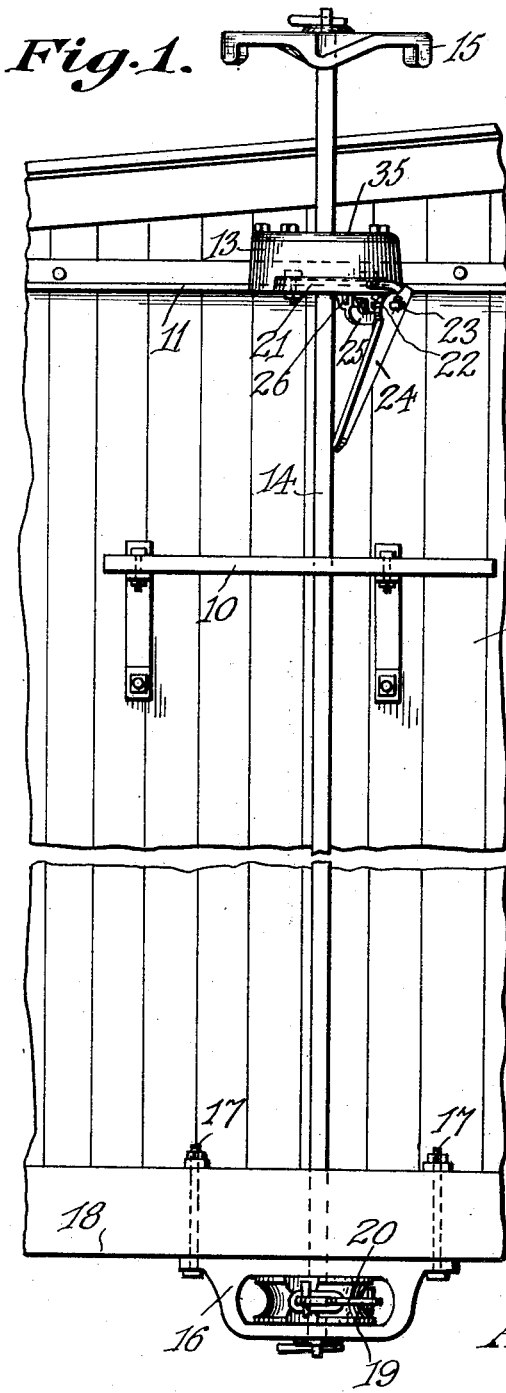
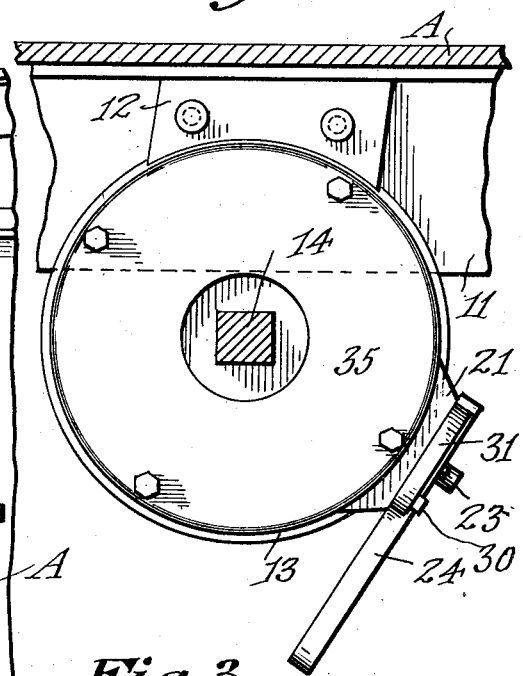
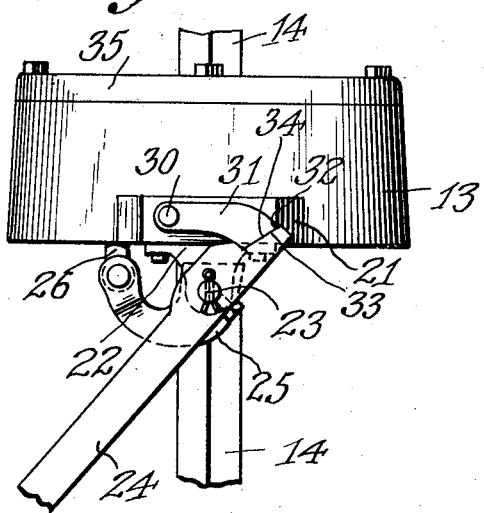
Inventor
Albert A. Smallwood,
By Parker & Snyder
Attorneys Jan. 31, 1933.　　　A. A. SMALLWOOD　　　1,895,823
FREIGHT CAR HAND BRAKE
Filed Nov. 26, 1929　　　2 Sheets-Sheet 2

Albert A. Smallwood, Inventor
By Parker & Snyder
Attorneys

Patented Jan. 31, 1933

1,895,823

UNITED STATES PATENT OFFICE

ALBERT A. SMALLWOOD, OF MARTINSBURG, WEST VIRGINIA

FREIGHT CAR HAND BRAKE

Application filed November 26, 1929. Serial No. 409,843.

The invention relates to freight car hand brakes, and more especially to operating mechanism for brakes of the type mentioned.

The primary object of the invention is the provision of mechanism of this character, wherein a brakeman or other attendant can readily and easily operate the brakes of a freight car, either in applying or releasing said brakes, the mechanism being of novel form to assure perfect working of the brakes.

Another object of the invention is the provision of mechanism of this character, wherein a brakeman standing on the brake staff step can effect the instant release of the brakes by actuating a lever on contact of his knee or leg therewith, thus permitting freedom of the hands of said brake for manipulation of the hand wheel of the brakes if necessary for the gradual release through step by step movement or otherwise hand control of said brakes.

A further object of the invention is the provision of mechanism of this character, wherein the locking and releasing means is of novel form to assure ease and control in the working of the brakes.

A still further object of the invention is the provision of mechanism of this character, which is extremely simple in construction, thoroughly reliable and efficient in purpose and operation, strong, durable, readily and easily handled and inexpensive to manufacture and install.

With the above and other objects in view the invention consists in the features of construction, combination and arrangement of parts as will be hereinafter more fully described, illustrated in the accompanying drawings showing the preferred embodiment of said invention, and pointed out in the claim hereunto appended. It is to be understood that changes, variations and modifications may be made in the invention as come properly within the scope of the appended claim, without departing from the spirit of said invention or sacrificing any of its advantages.

In the accompanying drawings:

Figure 1 is a fragmentary elevation of a freight car body showing the brake controlling mechanism constructed in accordance with the invention applied.

Figure 2 is a horizontal sectional view showing a detail plan of the locking and releasing mechanism.

Figure 3 is a detail elevation of the same.

Similar reference characters indicate corresponding parts throughout the several views in the drawings.

Figure 4:
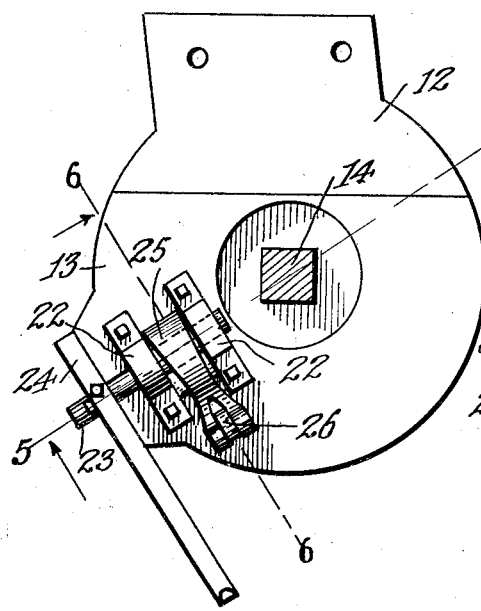
Figure 4 is a bottom plan.
Figure 5:
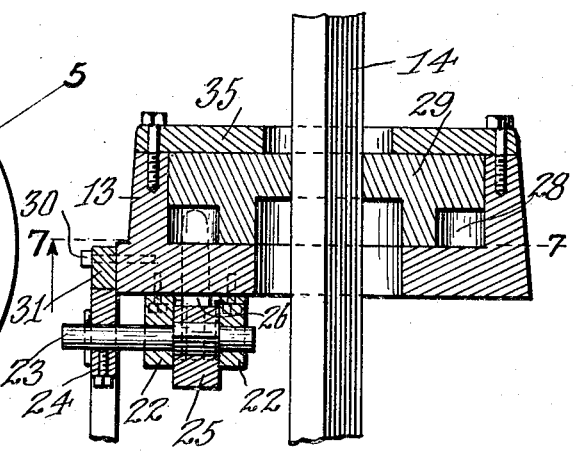
Figure 5 is a sectional view on the line 5—5 of Figure 4.
Figure 6:
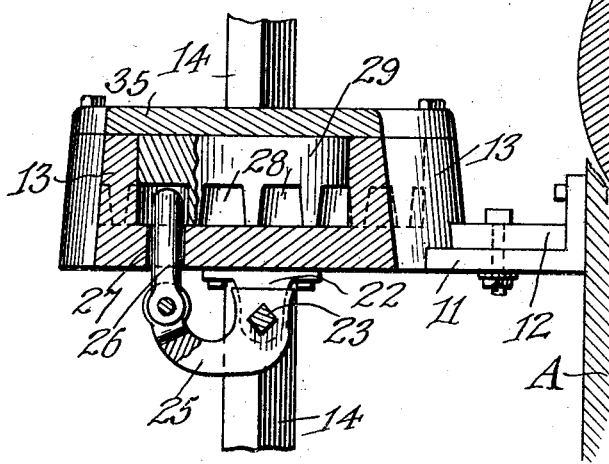
Figure 6 is a sectional view on the line 6—6 of Figure 4.
Figure 7:
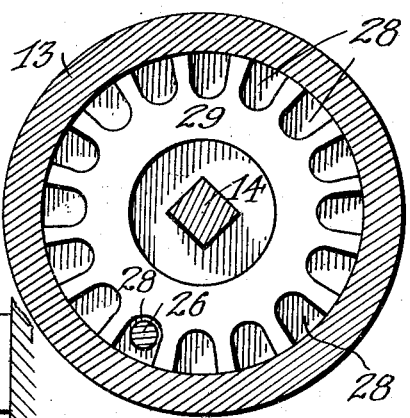
Figure 7 is a sectional view taken on the line 7—7 of Figure 5.

Referring to the drawings in detail, A, designates generally a portion of the end of a freight car body on which is mounted the brake staff step 10, the latter being in the usual position and above this step is a cross iron 11, to which is attached the under cut angularly disposed hanger or flange 12, of a circular casing 13, the latter housing a part of the locking and releasing mechanism of a brake control.

Extending centrally through the casing 13, is a brake staff 14, which has its upper end protruded above the roof of the car body A, and carries a hand wheel 15, while the lower end of this staff extends through a bracket 16, bolted at 17, to the under side of the base sill 18, of the car body.

Confined within the bracket 16, and made fast to the staff 14, is a chain winding pulley 19, having secured thereto the brake chain 20, the latter being wound and unwound to and from the pulley 19, in the working of the brakes.

Formed on the casing 13, at the proper point thereof is a lateral boss 21, and to the under side of the latter is secured a bearing 22, in which is journaled a stub shaft 23, to the outer end of which is secured a knee or leg operating lever 24, the same being properly disposed so that a brakeman standing on the step 10, can manipulate said lever by his knee or leg, and also connected with this stub shaft 23, is a crank arm 25, pivotally supporting a locking pin 26, the latter working through a suitable opening 27, formed in the bottom of the casing 13. This pin 26, is adapted to engage in anyone of a series of peripheral notches 28, formed in the underside of disk-like member or gear 29, rotatably fitted within the casing 13, and secured to the brake staff 14, which passes centrally through said casing as shown in Figure 1, of the drawings.

Arranged on the boss 21, and pivoted thereto at 30, is a gravitating latching pawl or dog 31, which is designed by its own weight to become seated in a keeper recess 32, formed in the lever 24, as is clearly shown in Figure 3, of the drawings, so that this lever at its upper end will abut said pawl or dog and be held in position for the engagement of the pin 26, in a registering notch 28, in the member or gear 29, thus locking the latter and the brakes when the same are released or applied.

By reason of the angular disposition of the lever 24, and the beveled contacting faces 33 and 34, of the recess 32, said pawl or dog 31, as shown in Figures 1 and 3 of the drawings when pressure is applied to the lower end of the lever 24 in a right hand direction will be caused to ride upwardly in the recess 32 and over the upper end of said lever to releasing position above said upper end of the lever and thus the pin 26, during this movement, will be disengaged from the member or gear 29, thereby permitting the turning of the wheel 15, for the hand application or release of the brakes as will be clearly apparent.

The casing 13, carries a removable cover plate 35, so that access may be had to the interior of the casing should the occasion require. The hand wheel 15, and pulley 19, are removably secured on the brake staff 14, as will be apparent.

What is claimed is:—

A car hand brake of the kind described, comprising a staff having a hand wheel, winding and unwinding means at the lower end of the staff for a brake chain, a casing about the staff at the proper point above a brake staff step, a knee operated lever pivoted to the casing, a rotary member secured to the staff and within the casing and having peripheral notches, a locking and releasing pin engaging the notches and actuated by the lever, and a latching element mounted to gravitate in frictional engagement with the lever when the latter has moved the pin to locking position to hold said lever.

In testimony whereof I affix my signature.

ALBERT A. SMALLWOOD.